Nov. 15, 1938.  L. BIRKIGT  2,136,964
SUPERCHARGED ENGINE FED THROUGH A RADIATOR SYSTEM
Filed Oct. 8, 1937  3 Sheets-Sheet 1
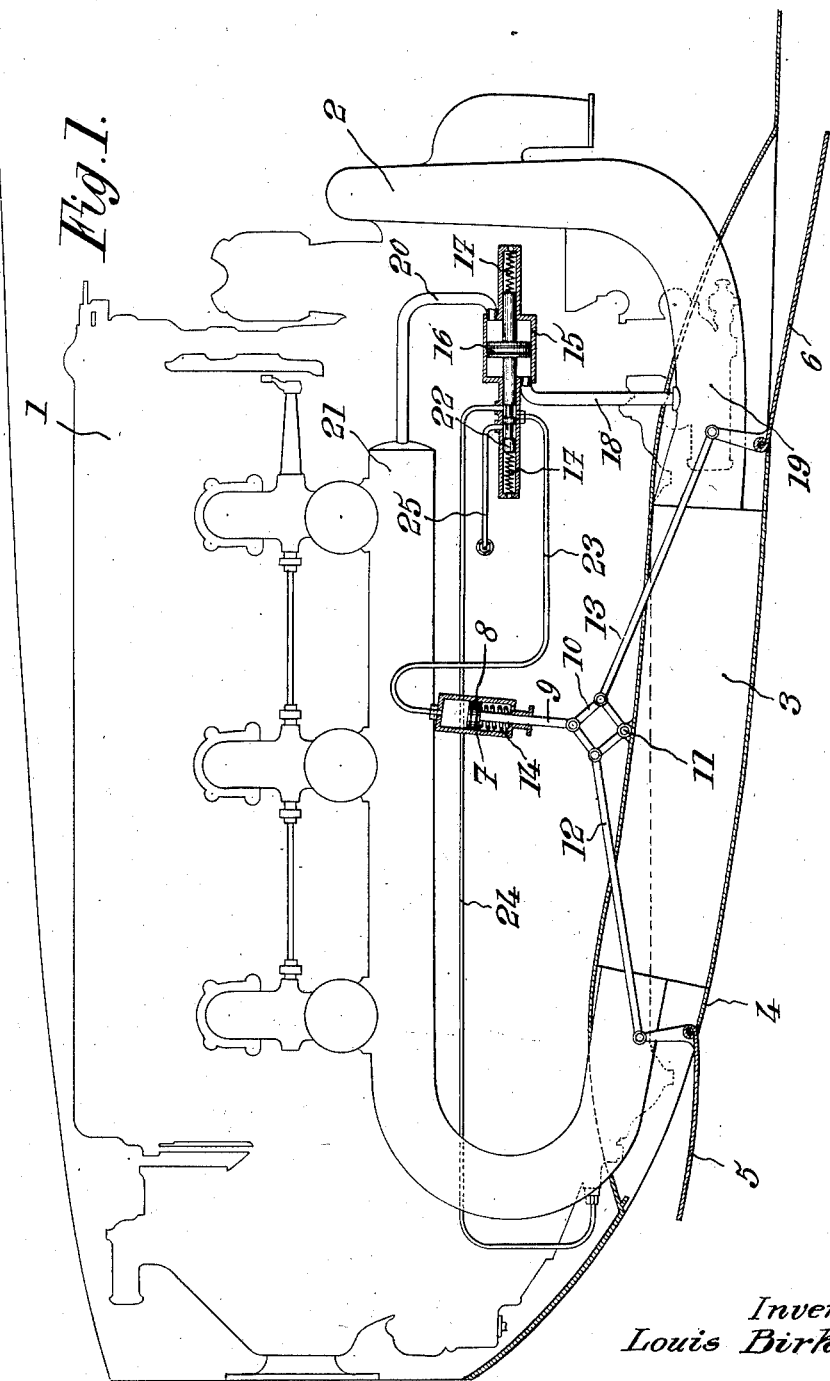
Inventor:
Louis Birkigt,
Attorneys

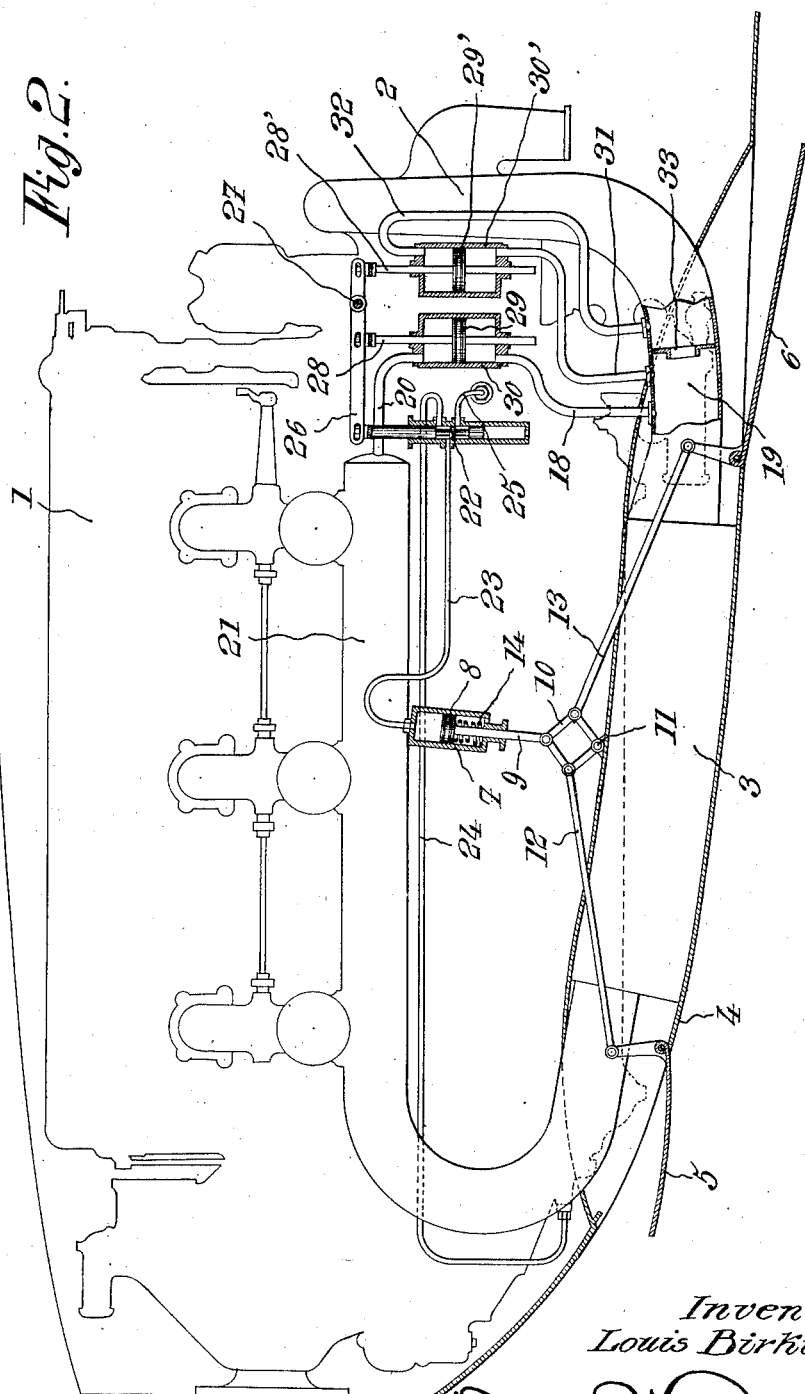

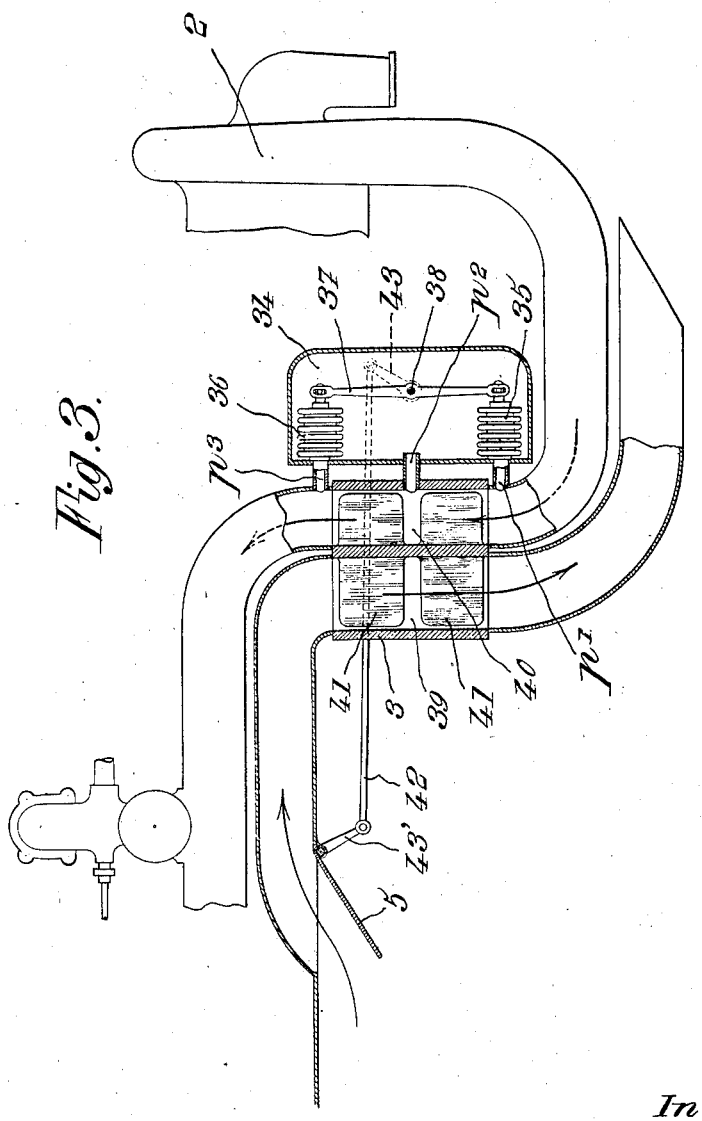

Patented Nov. 15, 1938

2,136,964

UNITED STATES PATENT OFFICE

2,136,964

SUPERCHARGED ENGINE FED THROUGH A RADIATOR SYSTEM

Louis Birkigt, Versoix, near Geneva, Switzerland

Application October 8, 1937, Serial No. 168,053
In Luxemburg June 19, 1937

12 Claims. (Cl. 123—119)

The present invention relates to supercharged engines fed through a radiator system, that is to say engines fed under pressure either with a carburetted mixture or with pure air, in which the feed fluid is cooled in a radiator system, generally cooled by the surrounding air, before said fluid is allowed to proceed to the engine, this arrangement being intended to avoid the loss of power which would otherwise result from the expansion of the fluid admitted to the engine. The invention is more especially, although not exclusively, concerned with engines of this kind intended to be fitted on aircrafts, and therefore intended to work at variable heights.

It will be readily understood that, under certain atmospheric conditions, too intensive a cooling of a fluid consisting either wholly or mostly of air containing a high percentage of moisture, may bring about the formation of frost inside the radiator system above referred to. The sections of the conduits or passages of said radiator system are then reduced, which involves an abnormal drop of pressure between the compressor and the engine, so that, finally, the power drops.

The object of the present invention is to provide a system which obviates these drawbacks.

According to the essential feature of the present invention, the system, which includes means for controlling the amount of cooling air flowing through the radiator system, is provided with a device for automatically operating said means such that, when the difference between the pressures ahead of said radiator system and behind it respectively increases as a consequence of the formation of frost inside said radiator system, said means are operated in the direction that reduces the flow of cooling air through the radiator, and inversely.

Other features of the present invention will result from the following detailed description of some specific embodiments thereof.

Preferred embodiments of the present invention will be hereinafter described, with reference to the accompanying drawings, given merely by way of example, and in which:

Fig. 1 diagrammatically shows, with some parts cut away, a supercharged engine arranged according to the present invention;

Fig. 2 is a similar view, also with some parts cut away, of another embodiment of the invention;

Fig. 3 is a diagrammatical view showing a modification of this embodiment.

In the following detailed description, it will be assumed that the power plant according to the invention is intended for an aircraft.

Concerning first the engine proper, it may be made in any suitable usual manner, provided, however that the flow of cooling air to the radiator system associated with said engine can be varied.

For instance, as shown by the drawings, the system may include an engine 1, for instance of the V-type, fed through a compressor 2, the latter being for instance of the centrifugal type and driven by the shaft of engine 1. The air supplied by this compressor is cooled in a radiator 3 surrounded by a fairing 4 provided with means for controlling the flow of cooling air through the radiator, for instance adjustable air inlets and outlets, or, better still, air inlets and outlets adjustable simultaneously, for instance by means of flaps 5 and 6 permitting to control the flow of cooling air through the radiator.

According to the essential feature of the present invention, in order to operate these control means, that is to say in the present example, the opening of shutters 5 and 6, I make use of an automatic device such that, when the difference of the pressures ahead of radiator 3 and behind it increases as a consequence of the formation of frost inside the radiator, said control means are operated in the direction that reduces the flow of cooling air through the radiator, and inversely.

It will be readily understood that, under these conditions, whenever frost starts being formed in the radiator, which increases the drop of pressure across said radiator and consequently causes shutters 5 and 6 to be closed, the cooling action of said radiator is reduced as a consequence of the partial closing of said shutters, and the hot air flowing through the frosted conduits of said radiator causes ice to melt and thus restoring the section of said conduits of the radiator to its initial value.

Concerning now the means for operating the shutter control means, they will be made in a different manner according as the engine 1 is intended to work with a constant adjustment, or, on the contrary, is intended to work in a satisfactory manner for different conditions of adjustment.

In the first case, variations of the difference between the pressures $p_1$ and $p_2$ existing respectively before and behind the radiator in the circuit including the compressor and the engine can result only from the formation of frost in radiator 3, whereas, in the second case, this difference, which, in the following description, will be designated by $p$, varies in accordance with the working conditions of the engine, and independently of the eventual formation of frost inside radiator 3.

It is therefore possible, in the first case, to subject said automatic device to the mere action of factor $p$, equal to $p_1 - p_2$, and this in such manner that, when $p$ increases, the flow of cooling air through radiator 3 decreases.

In the second case, on the contrary, it is necessary to eliminate the disturbing action that would be produced on the automatic device by the variations of $p$ resulting from variations of the working conditions of the engine if said device were subjected to the sole action of said factor.

In particular, this result may be ensured by placing the automatic device above referred to under the influence of a factor $$\frac{p}{p'}$$

in which $p$ still designates the difference of the pressures before and behind the radiator 3 along the circuit of the engine, and $p'$ is the difference between pressures $p_3$ and $p_4$ existing respectively at two points of said circuit where there is no risk of frost being formed and between which there is a drop of pressure either natural or produced artificially.

If $Q$ is the flow of air through the circuit in question including the compressor and the engine, the respective values of $p$ and $p'$ are:

$$p = AQ^2$$
$$p' = BQ^2$$

A and B being parameters which characterize the sections of flow in the portions of the circuit that are being considered.

It will be readily understood that the ratio $$\frac{p}{p'} \text{ which is equal to } \frac{A}{B}$$

is independent of the flow $Q$, and therefore of the working conditions of the engine 1. Furthermore, since only the portion of the circuit corresponding to $p$ can have frost formed therein, the formation of frost in radiator 3 involves a variation of A without modifying the value of B.

It can therefore be considered that the variations of factor $$\frac{p}{p'}$$

characterize merely the formation of frost in said radiator and are not influenced by eventual variations of the working conditions of engine 1.

Although it would be possible to have factor $p$ or factor $$\frac{p}{p'}$$

acting directly upon the automatic device which controls shutters 5 and 6, I have found that it is more advantageous to provide a servo-motor the driving element of which is controlled by the oil pressure of engine 1 and the pilot element of which is subjected to the action of the factor that has been chosen.

It is possible, on these principles, to provide many embodiments of such an automatic device, and, in particular, to have recourse to one of those which will now be more specifically described.

The first of these embodiments is illustrated by Fig. 1, and it corresponds to the case in which the engine is intended to work under uniform working conditions.

The driving element of this device consists of a system including a cylinder 7 and a piston 8, and the movable part of which, for instance piston 8, coacts with shutters 5 and 6 through suitable kinematic connecting means. These means consist for instance of a deformable parallelogram 10 one of the apexes of which is connected to the rod 9 of piston 8 whereas the opposed apex is pivoted about a fixed axis 11 and the other two apexes coact with rods 12 and 13 adapted to control shutters 5 and 6 respectively.

The oil pressure of the engine is caused to act, through valve means controlled by the pilot element of the servo-motor in any suitable manner, for example, as shown by the drawings, upon one of the faces of piston 8, the other face being subjected to the action of a return spring 14.

The above mentioned pilot element is then constituted by a cylinder 15 coacting with a piston 16, preferably subjected to the action of two springs 17, and by causing to act respectively upon the opposite faces of this piston the pressures $p_1$ and $p_2$ corresponding respectively, the first through a conduit 18 with a conduit 19 connecting compressor 2 to radiator 3, and the second, through a conduit 20, with the intake pipe 21 of engine 1.

This piston 16 is then caused to control a valve system arranged in such manner that it cuts off the feed of pressure to piston 8 when the difference $p_1 - p_2$ increases (supposing, as shown by the drawings, that cutting off of the pressure feed causes shutters 5 and 6 to be closed). For this purpose, the above mentioned valve system may for instance include a slide valve 22 carried by the rod of piston 16 and arranged in such manner that:

a.—On the one hand, for positions of piston 16 that correspond to the case in which there is no deposit of frost inside the radiator, the feed conduit 23 of cylinder 7 is brought into communication with a conduit 24 for the feed of oil under pressure; and b.—On the other hand, for the other positions of said position (corresponding to the presence of frost inside the radiator) conduit 23 communicates with a discharge conduit 25 leading back to the casing of engine 1.

With such an arrangement of a power plant including an engine the working conditions of which are supposed to be kept constant, the air feed to the engine is cooled through a radiator of adjustable efficiency the operation of which, in case of formation of frost inside it, results sufficiently clearly from the preceding explanations to make further description of its working unnecessary.

According to a second embodiment of the invention, corresponding to the case in which the engine is intended to work under variable conditions, the factor $$\frac{p}{p'}$$

is caused to act upon the pilot element of the servo-motor (supposing that I make also use, in this case, of a servo-motor of the kind of that above described).

For this purpose, as shown for instance by Fig. 2, the distributing slide valve 22 is controlled by a lever 26 pivoted about a fixed axis 27.

On this lever, two rods 28 and 28' are pivotally mounted on either side of the fixed axis 27, these rods being the piston rods of two pistons 29 and 29' cooperating with their respective cylinders 30 and 30'.

The respective faces of piston 29 are acted upon by pressures $p_1$ and $p_2$ above referred to.

The respective faces of piston 29' are acted upon by pressures $p_3$ and $p_4$, transmitted, through conduits 31 and 32 respectively from points located in pipe 19 before the radiator and on either side respectively of an orifice 33 of predetermined dimension.

The whole is arranged in such manner that, other things being the same, an increase of $p_1-p_2$ produces a displacement of slide valve 22 in the direction ensuring a reduction of the flow of cooling air.

The device just above described works in the following manner:

Supposing first that the working conditions of the engine remain unchanged, an eventual formation of frost inside radiator 3 produces an increase of $p$. The actions of pistons 29 and 29' no longer balance each other. Piston 29 moves upwardly and slide valve 22 is moved in the direction which tends to produce, through the action of the driving element of the servomotor, the closing of shutters 5 and 6.

Supposing now that the working conditions of engine 1 are modified, it will be readily understood that these variations involve proportional variations of $p$ and $p'$, and therefore do not modify the equilibrium of lever 26.

The whole of this automatic device therefore acts in response to the formation of frost inside the radiator, while remaining uninfluenced by variations of the working conditions of engine 1.

I may also, in a simple manner, make use merely of the pressures at three suitably chosen points of the circuit including the compressor and the engine for obtaining factors $p$ and $p'$. In this case, $p$ is the difference $p_1-p_2$ between the two first pressures and $p'$ is the difference $p_2-p_3$ between the intermediate pressure and the last pressure.

Of course, the points at which these pressures are taken must be chosen in such manner that one of the quantities $p$ or $p'$, $p'$ for instance, corresponds to the pressure drop in a portion of the radiator in which formation of frost can take place, while $p$ corresponds to a pressure drop in a portion of the circuit where there is no risk of frost being formed, so that such a formation of frost inside the radiator produces variations of factor $$\frac{p}{p'}$$

Such an arrangement has, among other advantages, that of permitting an easier materialization of factor $$\frac{p}{p'}$$

since only three pressures are called into play.

An embodiment of such an arrangement is shown by Fig. 3.

In this embodiment, I provide a fluidtight casing 34 in which the pressure is equal to the intermediate pressure $p_2$, and inside said casing 34 there are two deformable boxes 35 and 36, inside which the pressures are $p_1$ and $p_3$ respectively, said deformable boxes being interconnected by a lever 37 pivoted in its middle part to an oscillating spindle 38. The oscillations of this spindle indeed characterize the variations of $$\frac{p}{p'}$$

corresponding to the formation of frost inside the radiator since the effects exerted upon the respective ends of the above mentioned lever are respectively pressures $p_1-p_2$ and $p_2-p_3$, above referred to.

It is quite clear that I might provide a great number of variations of such a regulation system, differing in particular from one another by the location of the points where the pressures $p_1$, $p_2$ and $p_3$ are taken, and also by the arrangement of the members intended to modify, under the effect of oscillations of lever 37, the flow of cooling air.

In Fig. 3, I have shown, by way of example, such an embodiment, in which it has been supposed that radiator 3 was of the type including cooling fins, that is to say included two juxtaposed chambers 39 and 40, corresponding respectively to the flow of air to be cooled coming from compressor 2, and the flow of cooling air, adjusted for instance by means of a shutter 5, the wall common to both of these compartments acting as support for the cooling fins 41 distributed, for instance, into two groups and projecting into the two above mentioned compartments.

In this embodement of the invention, pressures $p_1$ and $p_3$ are taken respectively at points before and behind radiator 3; and Pressure $p_2$ is taken in a part of said radiator chosen in such manner that no frost can be formed before said part of the radiator. For instance, pressure $p_2$ may be taken at a point located between the two groups of cooling fins 41.

The oscillating spindle 38 is connected to shutter 5 for instance by means of a rod 42 and oscillating rods 43 and 43'.

In any case, whatever be the specific embodiment that is chosen, a system according to the present invention has many advantages, and in particular that of preventing drops of efficiency due to an eventual deposit of frost upon the inner walls of the feed air cooling radiator.

Of course, the automatic device operative by variations of the pressure difference $p_2-p_1$ might coact with any suitable means for controlling the flow of cooling air.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In a power plant including an internal combustion engine, a compressor for the feed of said engine, means for conducting air from the compressor to the engine, and a radiator interposed in said conducting means between said compressor and said engine, a device for opposing the formation of frost inside said radiator which comprises, in combination, means for controlling the cooling action of said radiator, and means operative by the pressure drop in said conducting means across said radiator for operating said control means so as to reduce the cooling action of said radiator when said pressure drop increases.

2. In a power plant including an internal combustion engine, a compressor for the feed of said engine, means for conducting air from the compressor to the engine, and an air cooled radiator interposed in said conducting means between said compressor and said engine, a device for opposing the formation of frost inside said radiator which comprises, in combination, means for controlling the flow of cooling air acting on said radiator, and means operative by the pressure drop in said conducting means across said radiator for operating said control means so as to reduce the flow of said cooling air when said pressure drop increases.

3. In a power plant including an internal combustion engine, a compressor for the feed of said engine, and an air cooled radiator interposed between said compressor and said engine, the latter being adapted to run at uniform speed, a device for opposing the formation of frost inside said radiator which comprises, in combination, means for controlling the flow of cooling air acting upon said radiator, and differential means, operative by the pressures of the fluid on its way from said compressor to said engine, respectively before said radiator and behind it, for operating said control means so as to reduce the flow of said cooling air when said pressure drop increases.

4. In a power plant including an internal combustion engine adapted to run under uniform working conditions, a compressor for the feed of said engine, and an air cooled radiator interposed between said compressor and said engine, a device for opposing the formation of frost inside said radiator which comprises, in combination, means for controlling the flow of cooling air acting on said radiator, a servo-motor for operating said means, and means differentially operative by the pressures of the fluid on its way from said compressor to said engine respectively before said radiator and behind it for controlling said servo-motor so as to cause it to produce a reduction of the flow of said cooling air when the pressure drop across said radiator increases.

5. A device according to claim 4 for use with an engine including a source of oil under pressure, in which said servo-motor is operative by said oil.

6. In a power plant including an internal combustion engine adapted to run under variable working conditions, a compressor for the feed of said engine, and fluid conveying means extending from said compressor to said engine and including an air cooled radiator, a device for opposing the formation of frost inside said radiator which comprises, in combination, means for controlling the flow of cooling air acting upon said radiator, and means, operative by the respective pressure drops across the portion of said radiator where frost can form and across another portion of said conveying means where no frost can form, for operating said control means so as to reduce the flow of said cooling air when the first mentioned pressure drop increases.

7. In a power plant including an internal combustion engine adapted to run under variable working conditions, a compressor for the feed of said engine, and fluid conveying means extending from said compressor to said engine and including an air-cooled radiator, a device for opposing the formation of frost inside said radiator which comprises, in combination, means for controlling the flow of cooling air acting upon said radiator, a servo-motor for operating said means, and means responsive to variations of the respective pressure drops across the portion of said radiator where frost can form and across another portion of said conveying means where no frost can form, for controlling said servo-motor so as to cause it to produce a reduction of the flow of said cooling air when the first mentioned pressure drop increases.

8. A device according to claim 6 in which the two portions of said conveying means across which exist the pressure drops which influence said control means are at a distance from each other.

9. A device according to claim 6 in which the last mentioned portion of the conveying means, where no frost can form, is located ahead of said radiator.

10. A device acording to claim 6 in which the two portions of said conveying means across which exist the pressure drops which influence said control means adjoint each other, having a common point.

11. A device according to claim 6 in which the last mentioned portion of the conveying means, where no frost can form, is a portion of said radiator adjoining the first mentioned portion thereof.

12. In a power plant including an internal combustion engine adapted to run under variable working conditions, a compressor for the feed of said engine and fluid conveying means extending from said compressor to said engine and including an air cooled radiator having a passage forming a part of said conveying means, a device for opposing the formation of frost inside said radiator which comprises, in combination, means for controlling the flow of cooling air acting upon said radiator, a fluidtight casing communicating with an intermediate part of said fluid conveying passage of said radiator, a lever pivoted about a fixed point inside said casing, two deformable boxes inside said casing communicating with respective parts of said fluid conveying means located before and behind said radiator, said deformable boxes being adapted to act upon respective points of said lever located on either side of the pivoting point thereof, and means operative by said lever for actuating said cooling air control means, so as to reduce the flow of said cooling air when frost forms in one of the parts of the radiator.

LOUIS BIRKIGT.